United States Patent
Hermann et al.

(10) Patent No.: US 6,631,893 B2
(45) Date of Patent: Oct. 14, 2003

(54) ELASTIC BEARING WITH HYDRAULIC DAMPING PROPERTIES

(75) Inventors: Waldemar Hermann, Lettgenbrunn (DE); Volker Grünig, Altenburg (DE)

(73) Assignee: Woco Franz-Josef Wolf & Co., Bad Soden-Salmunster (DE)

(*) Notice: Subject to any disclaimer, the term of this patent is extended or adjusted under 35 U.S.C. 154(b) by 0 days.

(21) Appl. No.: 09/890,464

(22) PCT Filed: Nov. 29, 2000

(86) PCT No.: PCT/EP00/11952

§ 371 (c)(1),
(2), (4) Date: Nov. 13, 2001

(87) PCT Pub. No.: WO01/40675

PCT Pub. Date: Jun. 7, 2001

(65) Prior Publication Data

US 2002/0135113 A1 Sep. 26, 2002

(30) Foreign Application Priority Data

Dec. 2, 1999 (DE) .......................................... 199 58 011

(51) Int. Cl.⁷ .......................... F16F 13/00; F16F 15/00; F16F 5/00; F16F 9/00; F16M 11/00
(52) U.S. Cl. ................ 267/140.13; 267/219; 267/140.2
(58) Field of Search ................................ 267/219, 292, 267/140.11, 140.12, 140.13, 140.2, 140.3, 140.4, 140.5, 141, 141.1, 141.2, 141.3, 141.6

(56) References Cited

U.S. PATENT DOCUMENTS

| | | | |
|---|---|---|---|
| 4,682,753 A | * 7/1987 | Clark | ..................... 267/140.13 |
| 5,167,403 A | 12/1992 | Muramatsu et al. | |
| 5,217,211 A | 6/1993 | Ide et al. | |
| 5,314,173 A | 5/1994 | Ide et al. | |
| 5,370,375 A | * 12/1994 | Kojima | ................... 267/140.14 |
| 5,492,311 A | * 2/1996 | Kurr et al. | ............. 267/140.13 |
| 5,992,833 A | * 11/1999 | Tanahashi | ............. 267/140.14 |
| 6,224,045 B1 | * 5/2001 | Muramatsu et al. | ... 267/140.13 |

FOREIGN PATENT DOCUMENTS

| | | |
|---|---|---|
| DE | 32 10 731 A1 | 10/1983 |
| EP | 0 115 417 A2 | 8/1984 |
| EP | 0 851 146 A1 | 7/1988 |
| JP | 10-238587 | 9/1998 |
| JP | 11-082611 | 3/1999 |
| JP | 11-101297 | 4/1999 |

* cited by examiner

*Primary Examiner*—Christopher P. Schwartz
*Assistant Examiner*—Devon Kramer
(74) *Attorney, Agent, or Firm*—Burns, Doane, Swecker, Mathis, LLP

(57) ABSTRACT

A pneumatically regulated classic bearing dampens hydraulically and decouples vibrations of a small amplitude using a freely displaceable element. The bearing can be engaged using a pneumatically activated control chamber, which has a miniature configuration and is located beneath the freely displaceable element, in such a way that the element forms a deformable or displaceable element for the control chamber. In place of a compensation regulation, in the control chamber, a shift to one of three possible, pneumatically determined control states preferably takes place. The states are VENTILATED, CLOSED and PRESSURIZED.

3 Claims, 3 Drawing Sheets

ELASTIC BEARING WITH HYDRAULIC DAMPING PROPERTIES

The present invention relates to a hydraulically damped elastic bearing.

Such bearings comprising a loose piece for uncoupling vibrations are commonly known in the state of the art for numerous disclosures of different embodiments. A loose piece in such a bearing may be a disc or annular disc. In fact it is disposed loosely in a cavity or a disc-shaped material configured in a different manner which is vibratory, especially vibratory in axial direction with respect to its main surfaces, and which is restrained in a safety device, namely a so-called cavity, enclosing the loose piece with a clearance. Instead of using a piece of metal or rubber which is unfixed and therefore loosely inserted in the cavity it is also common to use an elastomer diaphragm as a loose piece. Such a diaphragm is thin, also partly reinforced and vibratory. However, according to the state of the art said loose pieces are disposed in cavities of the aforementioned kind to limit the vibration of such uncoupling diaphragms to a certain deformation path corresponding to the low amplitudes of the vibrations to be uncoupled and the path-length thereof. Accordingly, the term "loose piece" used in the following comprises, besides uncoupling elements being unfixed in path-way limiting cavities, also uncoupling diaphragms of the aforementioned kind.

Furthermore, in the field of automotive engineering numerous means to expand the field of use and to improve the comfort of uncoupling or not uncoupling hydraulic bearings are known, which act upon the damping fluid and change the bearing characteristics thereby. Said means are, however, mostly devices which affect the damping fluid by means of rheological, hydraulical, configurative vibrational, mechanical or pneumatical regulation and compensation forces.

In this context propositions have been known for a long time to change the characteristics of hydraulic bearings during their use, i.e. during the dynamical loading of the hydraulic bearing, in a more effective way by damping or absorbing unwanted vibration introduced into the bearing by means of pneumatic compensation. In recent years this has all the way been accomplished by pneumatically acting on the outer side of a compensation diaphragm bounding a compensation chamber. The diaphragm normally does not influence the damping performance, and the characteristics of a hydraulic bearing. Thus, contrary to its original destination as a spring, the compensating diaphragm is remodelled to a component of the bearing significantly modifying the bearing characteristics. In case of unwanted high amplitude vibrations for example it stiffens the spring and in case of unwanted low amplitude vibrations it flattens the spring characteristic curve. This pneumatical effect can be realized by means of compression as known for example from DE 32 10 731 A1, however, it is also possible to use a depression regulation as disclosed in EP 851 146 A1.

Commonly known pneumatically controllable hydraulic bearings are, however, luxury articles regardless of their functional capability. They require complicated real time controlling systems. Additionally, in order to generate the required forces for the compensation diaphragm with its relatively large surface area pneumatic compressors, buffer tanks and switching systems are needed which are dimensioned in a way that these means have to be located outside the hydraulic bearing to be controlled since it is not possible to integrate them in the limited space of such bearings.

Starting from the state of the art described above it is an object of the invention to provide a hydraulic bearing especially an power unit bearing for automotive engineering which is practical with respect to its size, cost and power, which allows for a reduced pneumatic expense and which provides a spring characteristic which can be influenced effectively.

The invention solves this problem by an elastic bearing providing the features of claim 1.

It is an essential feature of the invention that the pneumatic switching of a hydraulic bearing which is constructed in a classical way is not achieved by acting on the compensating diaphragm but by acting on the uncoupling element especially on an uncoupling diaphragm, namely a loose piece. This allows for a reduction and minimization of the required pneumatical expense especially with respect to the required size of the pneumatic component.

According to an embodiment this basic idea of the invention is further developed and instead of using a compensation control much more simple and practical means are provided replacing the control by an adjustable setting of three different operation states of the bearing in order to set the dampening function of the hydraulic bearing to SMOOTH, MEDIUM-HARD and HARD. It is generally sufficient that the three adjustable dampening states are predetermined by the driver at the console of an automobile. In case the automobile is equipped with a sensor technology the three states of the hydraulic bearing according to the invention can be switched pneumatically as a result of a read out process of the controller of the automobile. When air is used as a switching medium three dampening states are provided which have an inherent band width and a dynamic to make a real time compensation and its complicated controlling technique needless, even in a conceptional view.

Further embodiments of the invention are objects of the dependent claims.

The invention is elucidated below by means of illustrative embodiments and in relation to the drawings.

Figure 1:
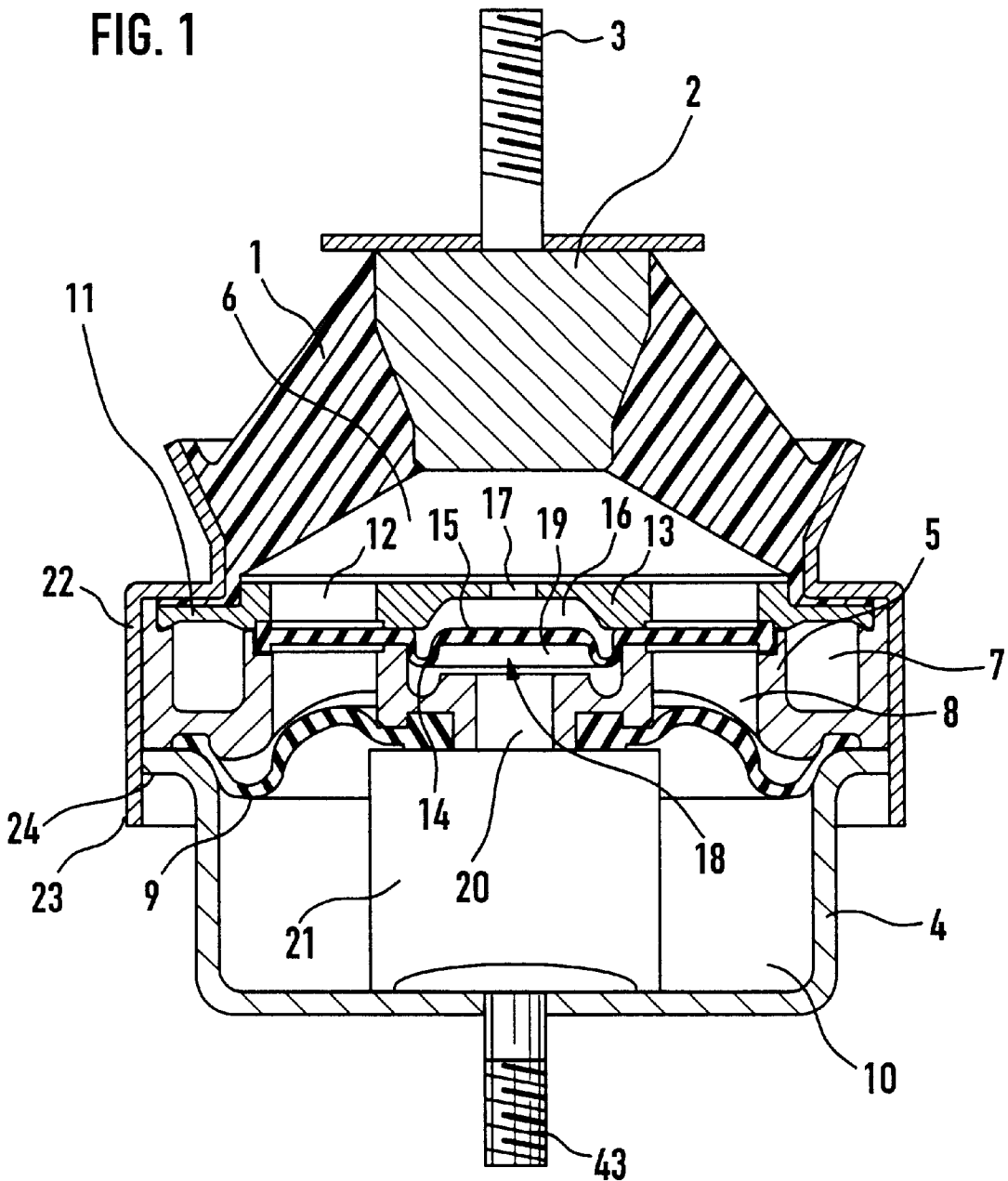
FIG. 1 shows a first embodiment of a hydraulic bearing according to the invention in axial section.

A first embodiment of the hydraulic bearing according to the invention is shown in FIG. 1 in axial section. The power unit bearing presented here is designed for use in an motor vehicle. The bearing essentially comprises a conical annular support spring 1 supporting a load connection fitting 2 carrying a threaded connection bold 3 for connecting the power unit. The support spring 1 rests indirectly on a cup-shaped chassis connection fitting 4. A common separating disc is inserted between the load connection fitting 4 and the chassis-side edge of the support spring 1. A working chamber filled with hydraulic damping fluid is defined between the separating disc 5 and the support spring 1. This working chamber 6 is usually connected with a compensating chamber 8 through a throttle channel 7 which is part of the separating disc. The compensating chamber 8 is formed in a pressure-proof and fluid-tight manner between the chassis-side surface of separating disc 5 and a compensating diaphragm 9. Said diaphragm 9 is elastically and essentially resistanceless deformable. In case of a deformation of the support spring 1 the hydraulic damping fluid is pumped from the working chamber 6 through the throttle channel 7 into the compensating chamber 8 and the compensating diaphragm is deformed resistanceless into the empty space 10 which is provided in the cup-shaped chassis connection fitting 4.

An annular cavity 11 is fixedly clamped between the chassis-side edge of the support spring 1 and the load-side surface of the separating disc 5. This cavity essentially consists of a peripheral annular portion extending around the circumference and clamping the cavity. Said portion provides star-shaped joints 12 supporting a central annular and dome-like portion which is the real loose cavity 13. The loose cavity is fixedly clamped in a pressure-proof and fluid-tight manner at its chassis-side annular rim to the outer periphery of a rolling ply 14. This defines an uncoupling chamber 16 between an elastomer loose piece 15 supported in central position of the rolling ply and the loose cavity 13. The loose cavity 13 hydraulically communicates with the damping fluid of the operational chamber 6 by means of passages 17. The loose piece and the annular rolling ply are positioned in a central recess 18 provided in the separating disc 5.

As shown in FIG. 1 the chassis-side surface of the loose cavity 13 which is configured in a dome-type manner and the surface of the loose piece 15 facing that surface are dimensioned and configured complementary to each other. Thus, the passages connecting the uncoupling chamber 16 and the damping fluid of the working chamber 6 can be closed in a fluid-tight and pressure-proof manner by lifting and pressing the loose piece 15 in and against the dome of the loose cavity 13.

Furthermore, the central recess 18 in the separating disc 5 is configured in a cup-shaped manner defining a controlling chamber 19 between the chassis-side lower surface of the loose piece 15 and the rolling ply 14. The loose piece is movable in the axial direction due to its rolling ply. It can be moved into and out of the controlling chamber 19. This axial movement is either a vibrational movement under the influence of vibrations introduced by the damping fluid or a movement caused by pneumatic pressure which can be generated in the controlling chamber 19 by means of a pneumatic device 21 which is connected by a pneumatic connection 20. As shown in FIG. 1 the pneumatic device is not only integrated in the bearing especially in the cup-shaped chassis connection fitting 4 but provides the necessary expanding space 10 required by the compensating diaphragm 9 which is connected with an outer ventilation.

A bearing constructed in this way is clamped in an annular casing 22. In FIG. 1 the chassis-side rim 23 of the casing 22 of the bearing is shown in a pre-assembled state of the bearing. After the final assembly of the hydraulic bearing the chassis-side rim 23 of the casing 22 is radially crimped inwards under an outer flange 24 which is formed on the chassis connection fitting 4.

Figure 3:
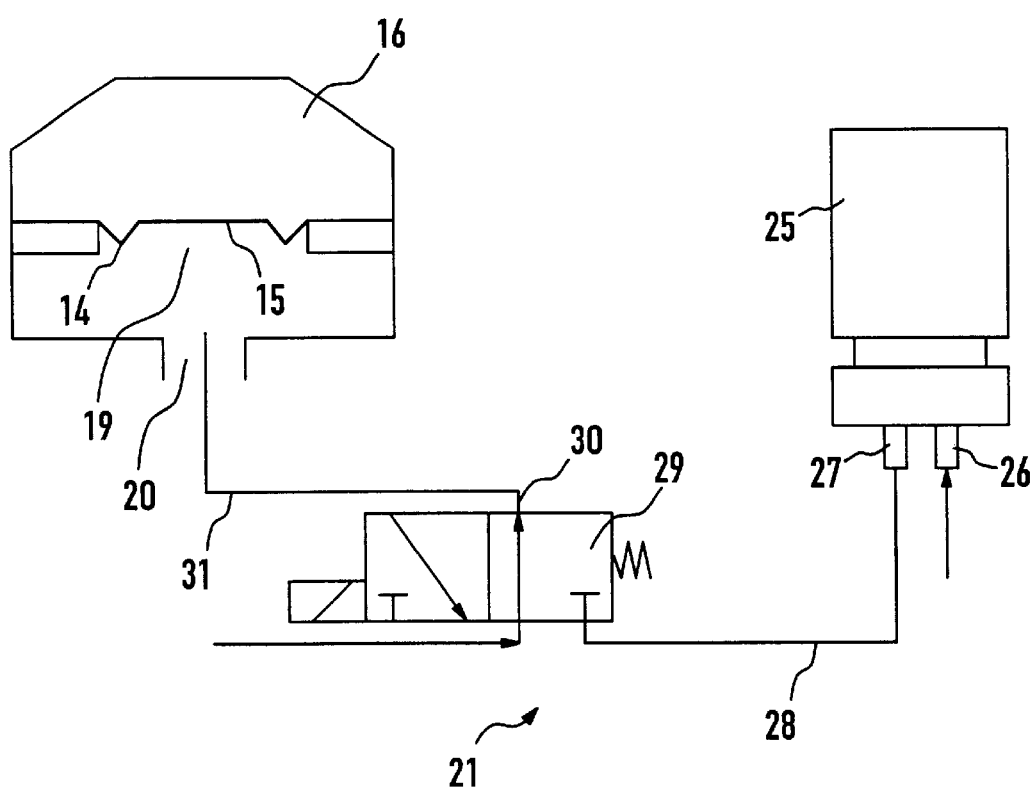

In FIG. 3 the pneumatic device 22 is shown in more detail as a block diagram.

According to FIG. 3 the pneumatic device 21 consists of two parts, namely a compressor having an intake fitting 26 and a pressure fitting 27 which is connected with a 3/2-port directional control valve 29 through a conduct 28. An outlet fitting 30 is connected with the fitting 20 of the controlling chamber 19 by connection 21 comprising a movable partition, namely the loose piece 15 supported by the rolling ply 14. The uncoupling chamber 16 has been described in detail in connection with the embodiment according to FIG. 1. It is schematically outlined lying opposite the controlling chamber 19.

The 3/2-port directional control valve is designed to provide three switching states at its outlet 30. These states are OPEN, CLOSED and PRESSURIZED. In the schematical block diagram of FIG. 3 the 3/2-port directional control valve 29 is shown in the OPEN state.

In said OPEN state the valve fitting 30 freely communicates with the ambient atmosphere. Thus, the valve is open and the compressor 25 is switched to an inoperative state. Appropriately, the compressor is In said OPEN state the valve fitting 30 freely communicates with the ambient atmosphere. Thus, the valve is open and the compressor 25 is switched to an inoperative state. Appropriately, the compressor is switched off. Thus, the controlling chamber 19 is set under atmospheric pressure at least as long as the loose piece 15 is freely displaceable.

In the CLOSED state the pump is still inoperative. However, the connection with the atmosphere is closed. The air volume in the controlling chamber is closed off. Accordingly the vibration of the loose piece 15 in the controlling chamber generates a low underpressure or a low overpressure according to the phase of the vibration. This influences in a controlling manner the movability of the loose piece and accordingly the characteristic of the whole hydraulic bearing as being stiffened in a moderate way.

Finally in the PRESSURIZED state the compressor 25 is in operation, i.e. switched on, and connected with the 3/2-port directional control valve by a conduct 28. This valve connection communicates with an outlet 30. The passage to the atmosphere rests closed.

In this switching state the controlling chamber 19 is pneumatically set under overpressure delivered by the compressor 25. Alternatively, it is set under an offset pressure which is regulated by a valve by using the overpressure delivered by the compressor as a preset value. For pneumatically switching of usual power unit bearings for motor vehicles this static offset pressure is of about a hundreds of millibars especially about five hundred millibars. Under these circumstances the movability of the uncoupling loose piece is further hindered or restricted essentially stiffening once again the hydraulic bearing as a whole with respect to the switching state CLOSED.

By use of a simple compressor 25 and a simple 3/2-port directional control valve 29 pneumatically acting upon an uncoupling loose piece 15 of states can be realized without high costs and even for low-prize motor vehicles which are produced in series of low run. In practice this setting of three defined states of the spring is more pleasant for the driver compared to an expensive, complicated and less effective real-time regulation of pneumatic or hydraulic kind.

In principle the switching from one of the present switching states of the hydraulic bearing into another can be performed at the instrument panel of the motor vehicle so that the driver can adjust the performance and road behaviour of the vehicle according to what he personally considers appropriate or comfortable. However, said adjustment can also be performed automatically by an equipment on board—which nowadays is common even in the most simple vehicles—for example by using the engine speed as a set value.

Figure 2:
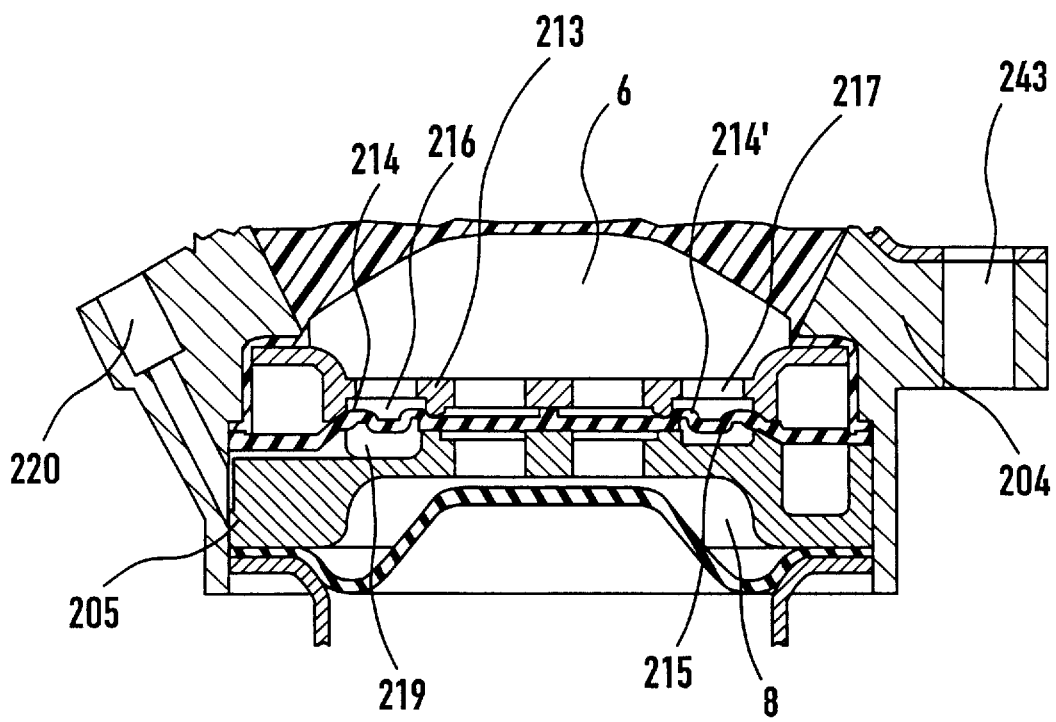
FIG. 2 shows a second embodiment of a hydraulic bearing according to the invention and FIG. 3 shows a block diagram of the components of the pneumatic hydraulic bearing according to the invention.

In FIG. 2 a second embodiment of a hydraulic bearing with features according to the invention is shown in parts. In contrast to the bearing shown in FIG. 1 in FIG. 2 the loose piece 215 is not assigned as a central disc but as an annular disc formed in an annular loose cavity 216. Accordingly the loose piece is not linked with an annular rolling ply which extends around the circumference. It is linked with a rolling ply 214' radially located inside and with a rolling ply 214 radially located outside. Furthermore, according to FIG. 2, the cup-shaped cylindrical controlling chamber 19 is configured in form of an annular controlling chamber 219. In contrast to the pneumatic device 21 being integrated in the hydraulic bearing, as illustrated in FIG. 1, the pneumatic device according to FIG. 2 is located outside the inner space of the hydraulic bearing. This is not shown in FIG. 2. Accordingly, the pneumatic device is completely separated from the hydraulic bearing or externally mounted. When a conduct 220 is used the controlling chamber 219 of the embodiment shown in FIG. 2 is also switchable to one of the three states OPEN, CLOSED and PRESSURIZED described above basically in the same way as described in connection with the embodiment according to FIG. 1. Finally, the embodiment of a hydraulic bearing shown in FIG. 2 by illustrating its essential elements which comprise the features according to the invention this embodiment is also characterized by a chassis connection fitting 204 which is not fixed to the chassis by a threaded bold 43 (FIG. 1) but by means of a flange connection fitting 243. Thus the separating disc 205 is not fixed on but directly in the chassis connection fitting 204.

The embodiment of the hydraulic bearing according to the invention shown in FIG. 2 has the advantage of an extremely low construction. Furhermore it provides at the same time a pneumatically adjustable hydraulic bearing.

What is claimed is:

1. Hydraulically damping elastic bearing comprising a conical annular support spring supporting a load connection fitting and resting directly or indirectly on a chassis connection fitting; a separating disc; a hydraulic working chamber filled with hydraulic damping fluid and defined between the separating disc and the support spring; a throttling channel connecting the working chamber with a compensating chamber opposed to the working chamber and defined between the separating disc and an elastic deformable compensating diaphragm; a loose piece for uncoupling low amplitude vibrations which is trapped in a cavity to be freely displaceable in a direction perpendicular to a plane of the separating disc; a casing enclosing the bearing and connecting components of the bearing which are located in axial succession in a fluid-tight and fixed manner; the loose piece being disc-shaped and fixed to the separating disc at its outer periphery by way of rolling plies; said loose piece being in contact with the damping fluid at a surface of said loose piece facing the working chamber and defining at its opposed surface a movable partition of a controlling chamber which can be pressurized pneumatically and which is separated from both the working chamber and the compensating chamber, and in combination with a compressor with a 3/2-port directional control valve for switching the controlling chamber in one of three states that include OPEN, CLOSED and PRESSURIZED, wherein the chassis connection fitting possesses a cup-shaped configuration for integrating the compressor and the 3/2-port directional control valve.

2. A bearing according to claim 1, including a loose cavity clamping the rolling ply of the loose piece at its periphery extending around the circumference in a pressure-proof and fluid-tight manner, the loose cavity and the loose piece bounding an uncoupling chamber which communicates with the damping fluid of the working chamber through passages provided at a load-sided partition of the loose cavity.

3. Bearing according to claim 2, wherein the loose piece is an elastomer loose piece having a surface facing the uncoupling chamber which is complementary to a surface of the loose cavity facing the uncoupling chamber and which is configured in a manner that the loose piece rests motionless against a wall of the loose cavity during the PRESSURIZED state sealing the uncoupling chamber against the working chamber in a compression-proof and fluid-tight manner.

* * * * *